United States Patent
Yamaguchi et al.

(10) Patent No.: US 8,032,195 B2
(45) Date of Patent: Oct. 4, 2011

(54) PORTABLE DEVICE, ACOUSTIC COMPONENT DISPOSITION METHOD AND ACOUSTIC COMPONENT ASSEMBLY

(75) Inventors: Atsushi Yamaguchi, Kawasaki (JP); Takao Shinoda, Kawasaki (JP); Satoshi Sudo, Kawasaki (JP); Shingo Yamaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 286 days.

(21) Appl. No.: 12/414,244

(22) Filed: Mar. 30, 2009

(65) Prior Publication Data
US 2009/0186673 A1    Jul. 23, 2009

Related U.S. Application Data

(63) Continuation of application No. PCT/JP2006/319810, filed on Oct. 3, 2006.

(51) Int. Cl.
*H04M 1/00* (2006.01)
(52) U.S. Cl. .................... 455/575.8; 181/149
(58) Field of Classification Search ............. 455/575.8, 455/575.2, 575.1; 181/110, 149, 160, 182, 181/105
See application file for complete search history.

(56) References Cited

U.S. PATENT DOCUMENTS

| 6,512,834 B1 | 1/2003 | Banter et al. |
| 2006/0065474 A1* | 3/2006 | Niwa et al. ............ 181/151 |
| 2009/0103704 A1* | 4/2009 | Kitada et al. ........... 379/167.14 |

FOREIGN PATENT DOCUMENTS

| EP | 1 197 119 B1 | 4/2002 |
| JP | 2-57692 | 4/1990 |
| JP | 7-131375 | 5/1995 |
| JP | 2003-503991 | 1/2003 |
| JP | 2004-180073 | 6/2004 |

OTHER PUBLICATIONS

Korean Office Action issued Nov. 19, 2010 in corresponding Korean Patent Application 10-2009-7007313.
Japanese Office Action mailed on Oct. 13, 2009 in corresponding Japanese Patent Application 2008-537384.
International Search Report for International Application No. PCT/JP2006/319810, mailed Oct. 31, 2006.
Chinese Office Action issued Jun. 9, 2011 in corresponding Chinese Patent Application 200680056005.X.

* cited by examiner

*Primary Examiner* — Tu Nguyen
(74) *Attorney, Agent, or Firm* — Staas & Halsey LLP

(57) ABSTRACT

A waterproof protection cover and an acoustic component are each disposed inside a portable device provided with a chassis having one or more holes. The acoustic component emits sound. For the acoustic component, an acoustic component having a maximum acoustic output between 0.25 W or more and 0.8 W or less is used. The waterproof protection cover secures an area of 114 mm² or more as an acoustically transparent portion for transmitting acoustic energy from the acoustic component.

9 Claims, 14 Drawing Sheets

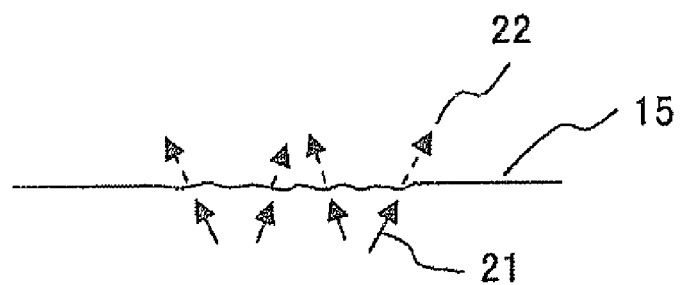
F I G. 2

| SPEAKER OUTPUT | MINIMUM NECESSARY AREA OF THE ACOUSTICALLY TRANSPARENT PORTION OF THE PROTECTION COVER | EXAMPLES OF THE MINIMUM NECESSARY DISTANCE BEFORE AND AFTER THE PROTECTION COVER | EXAMPLES OF THE VOLUME OF SOUND AT A DISTANCE OF 10cm OF A SAMPLE INCOMING TONE |
|---|---|---|---|
| 0.8W | 170mm$^2$ | 0.6mm | 74dB(A) |
| 0.6W | 150mm$^2$ | 0.5mm | 72dB(A) |
| 0.5W | 140mm$^2$ | 0.45mm | 71dB(A) |
| 0.25W | 114mm$^2$ | 0.35mm | 68dB(A) |

A SPEAKER WITH A SIZE OF Φ16*3.65mm IS USED IN THE EXPERIMENT.

FIG. 4

PORTABLE DEVICE, ACOUSTIC COMPONENT DISPOSITION METHOD AND ACOUSTIC COMPONENT ASSEMBLY

This application is a continuing application, filed under 35 U.S.C. §111(a), of International Application PCT/JP2006/319810, filed Oct. 3, 2006, the disclosure of which is incorporated herein by reference.

TECHNICAL FIELD

The embodiments discussed herein are related to a technology for mounting an acoustic component inside the chassis of a portable device provided with one or more hole.

BACKGROUND ART

A portable device, such as a cell phone, a recordable/reproducible digital camera or the like mount an acoustic component in order to emit sound outside and has a chassis with one hole or more in order to transmit sound emitted from the acoustic component. Such a portable device is vulnerable to water and dust. Therefore, as described in Patent document 1, in some conventional portable devices, a waterproof protection cover is disposed inside the holes and an acoustic component is disposed inside the waterproof protection cover.

FIG. 13 explains the disposition method of an acoustic component adopted in a conventional portable device. In FIG. 13, reference numerals 1301, 1302, 1303, 1304, 1305, 1306, 1307 and 1308 represent a chassis, a hole provided for the chassis 1302, a speaker being an acoustic component, packing, a waterproof protection cover, a double-sided tape for fixing the waterproof protection cover 1305 to the packing 1304, a double-sided tape for fixing the waterproof protection cover 1305 to the chassis 1301 and the vector of acoustic energy generated by the speaker 1303, respectively. A conventional portable device described in Patent document 1 adopts a waterproof protection cover having a gas-transparent characteristic of transmitting gas through it.

The vector 1308 of acoustic energy is troublesome in the neighborhood of the speaker 1303 that has generated the acoustic energy. For the waterproof protection cover 1305, a very thin one is adopted in order to suppress acoustic transmission loss. Therefore, as illustrated in FIG. 14, the troublesomeness of the vector 1308 easily generates a new vibration on the protection cover 1305 and when the vibration is generated, sound having a high frequency distortion component is emitted. Thus, in order to realize a preferable acoustic characteristic, it is indispensable to reduce the high frequency distortion component.

As such distortion countermeasures, a method of increasing a distance between the protection cover and the speaker in order to suppress the influence of the troublesomeness of the vector of the acoustic energy and/or to reduce the acoustic output of an acoustic component is adopted. Since part of sound that has transmitted through the protection cover is reflected by the chassis, it is usual to also increase a distance between the protection cover and the chassis. In FIG. 13, d3 and d4 indicate the distance between the protection cover 1305 and the chassis 1301 and the distance between the protection cover 1305 and (the vibration plate of) the speaker 1303, respectively.

It is necessary to emit the amount of sound sufficient for a user to clearly understand the content, which is not limited to a portable device. Thus, there is a limit in reducing the acoustic output. Therefore, conventionally, the distances d3 and d4 are increased. However, when the distances d3 and d4 are increased, naturally it becomes difficult to miniaturize and thin it. Therefore, in a portable device it is requested to dispose an acoustic component compactly while realizing a desirable acoustic characteristic.

Patent document 1: Japanese Laid-open Patent Publication No. H7-131375
Patent document 2: Japanese Laid-open Patent Publication No. 2003-503991
Patent document 3: Japanese Laid-open Patent Publication No.

DISCLOSURE OF INVENTION

It is an object of the present invention to provide a technology for compactly disposing an acoustic component inside a portable device while realizing a desirable acoustic characteristic.

It is commonly presumed in each of the portable devices of the first through fifth aspect of the present invention that a waterproof protection cover and an acoustic component are disposed inside a chassis with one hole or more and the following configurations are adopted.

The portable device in the first aspect comprises an acoustic component whose maximum acoustic output is 0.25 W or more, a waterproof protection cover in which an acoustically transparent portion for transmitting acoustic energy from the acoustic component is secured, in which a distance between the center portion of the acoustically transparent portion and a member located in a position nearest to the center portion on the acoustic component side is set between 0.35 mm or more and 0.6 mm or less.

In the first aspect, it is preferable that a distance between the center portion of the acoustically transparent portion and a member located in a position nearest to the center portion on the chassis side is set between 0.35 mm or more and 0.6 mm or less. It is also preferable that the GURLEY number indicating gas transparent characteristic of the waterproof protection cover is 1 through 10 seconds.

The portable device in the second aspect comprises an acoustic component whose maximum acoustic output is 0.25 W or more, a waterproof protection cover in which an acoustically transparent portion for transmitting acoustic energy from the acoustic component is secured, and a distance between the center portion of the acoustically transparent portion and a member located in a position nearest to the center portion on the chassis side is set between 0.35 mm or more and 0.6 mm or less.

The portable device in the third aspect comprises a waterproof protection cover in which an acoustically transparent portion for transmitting acoustic energy from the acoustic component is secured, wherein the area s of the acoustically transparent portion satisfies the following relationship.

$$s = ax + b,$$

wherein
x: the maximum acoustic output of an acoustic component
a: Coefficient under 114 more larger than 99
b: Constant under 91 more larger than 84

In the third aspect, it is preferable that both the first and second distances satisfy the relationship. In at least one of the first through fifth aspects, it is preferable that the maximum acoustic output is 0.1 W or more. It is also preferable that the GURLEY number indicating gas transparent characteristic of the waterproof protection cover is 1 through 10 seconds.

BRIEF DESCRIPTION OF DRAWINGS

FIG. 2 explains acoustic energy transmitting through a waterproof protection cover.

FIG. 4 illustrates the minimum necessary area s, the minimum necessary distance d and the volume of sound of a sample incoming tone at a distance of 10 cm against each maximum acoustic output.

BEST MODE FOR CARRYING OUT THE INVENTION

Preferred embodiments of the present invention will be explained in detail with reference to accompanying drawings.

Figure 1:
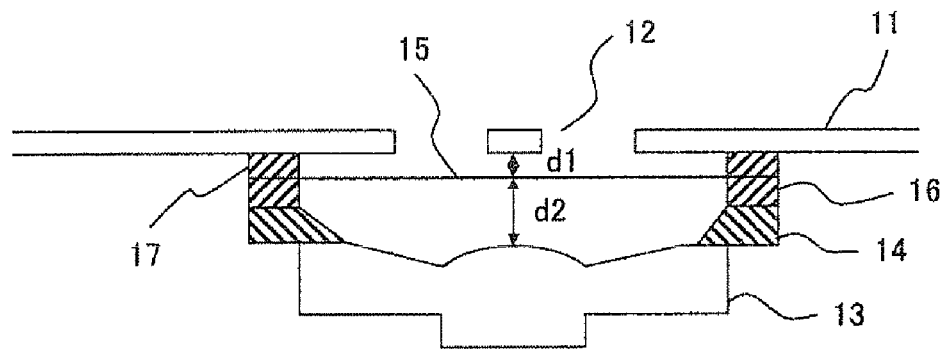
FIG. 1 explains an acoustic component disposition method according to an embodiment of the present invention.

FIG. 1 explains an acoustic component disposition method according to an embodiment of the present invention. In FIG. 1, reference numerals 11, 12, 13, 14, 15, 16 and 17 represent a chassis, a hole provided in the chassis 11, a speaker being an acoustic component, packing, a waterproof protection cover (hereinafter abbreviated as "protection cover"), a double-sided tape for fixing the waterproof protection cover 15 to the packing 14 and a double-sided tape for fixing the protection cover 15 to the chassis 11, respectively. For those both-sided tapes 16 and 17, PET (polyethylene terephthalate) is used. The packing 14 is fixed, for example, by an adhesive.

Reference numerals d1 and d2 in FIG. 1 indicate a distance between the protection cover 15 and the chassis 11, and a distance between the protection cover 15 and the speaker 13, respectively. Since its end is fixed, usually the vibration amplitude of the protection cover 15 becomes large as the position of the vibration amplitude approaches the center of the protection cover 15. For this reason, the distance d1 is defined to be between the center portion where the protection cover 15 is not fixed and a member located in a position nearest the center on the chassis side 11. Similarly, the distance d2 is defined to be between the center portion and a member located in a position nearest the center portion on the speaker 13 side. Therefore, when another member (for example, a dustproof cover) is disposed between the protection cover 15 and the chassis 11, the distance d1 is defined to be between the member and the protection cover 15. Similarly, when another member is disposed between the protection cover 15 and the speaker 13, the distance d2 is defined to be between the member and the protection cover 15.

Figure 12:
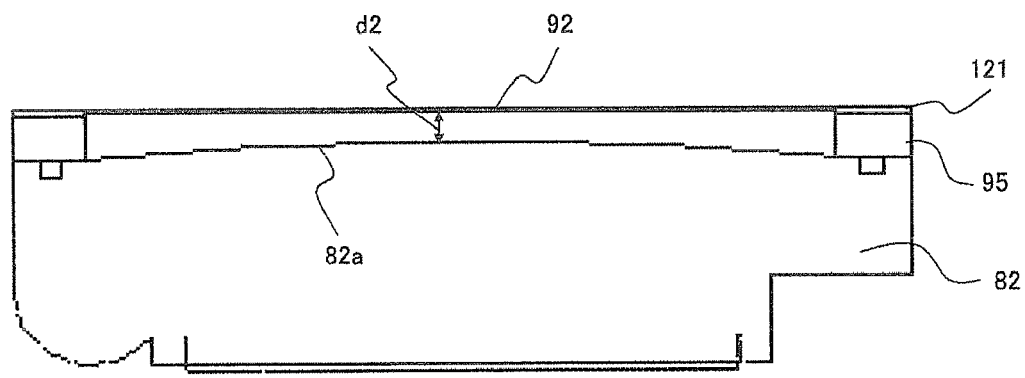
FIG. 12 is the cross-sectional view of an acoustic component assembly according to an embodiment of the present invention.
Figure 13:
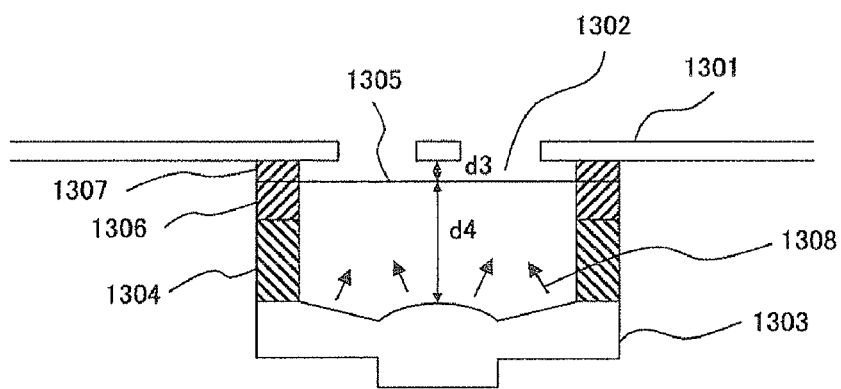
FIG. 13 explains the disposition method of an acoustic component adopted by the conventional portable device.
Figure 14:
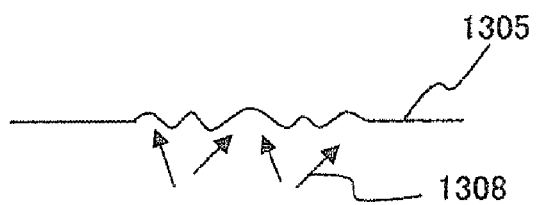
FIG. 14 explains vibrations generated on the waterproof protection cover by the troublesomeness of the vector of acoustic energy.

The distance d2 also varies depending on the type of the speaker 13. In the speaker 13 of the type illustrated in FIG. 1, the distance d2 is between the protection cover 15 and the vibration plate of the speaker 13. However, in the type (see FIG. 12) where a protection cover (hereinafter called "speaker cover" in order to avoid the confusion with the protection cover 15) is provided on a vibration plate, the distance d2 is between the protection cover 15 and the speaker cover.

Therefore, it is necessary to determine the above-described center portion taking into consideration a member disposed around the protection cover 15. Usually, it is sufficient to determine that the above-described center portion is inside the middle point of the center of the protection cover 15 and the end of an acoustically transparent portion.

In the present embodiment, as the protection cover 15, one also having gas transparent characteristic which is described in Patent document 2 is adopted. As the general evaluation method of the gas transparent characteristic, there is JIS P 8117. In the JIS P 8117, a time 100 ml of the air passes through a specimen having an area of 642 mm$^2$ is called GURLEY. The GURLEY number of the gas transparent characteristic of the protector cover 15 is between 1 and 10 GURLEY second (a time needed for 100 ml of air to transmit through it is between 1 and 10 seconds). The acoustic transmission loss of the protection cover is 3 dB or less and very small in the range of 300 to 3,000 Hz being the acoustic transmission frequency range of a general cell phone and the like.

It is because as illustrated in FIG. 2, the vector 21 of acoustic energy directly transmitted to outside the protection cover 15 by gas transmission is not small that very small acoustic transmission loss can be realized by the protection cover 15 having such a gas transparent characteristic. The reference numeral 22 in FIG. 2 illustrates the vector of acoustic energy transmitted to the chassis 11 side after directly transmitting through the protection cover 15.

Figure 3:
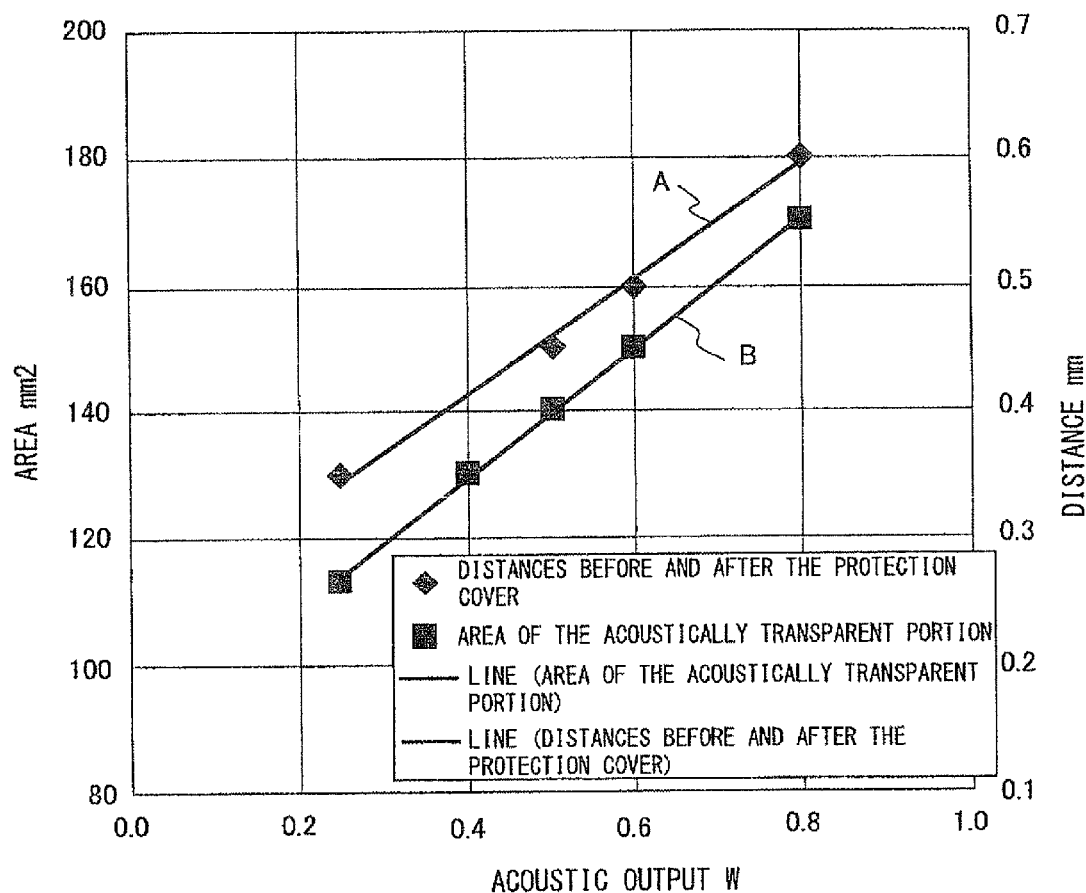
FIG. 3 is a graph illustrating the result of an experiment for checking the area of an acoustically transparent portion capable of maintaining a desirable acoustic characteristic, and the sizes of distances d1 and d2 against acoustic output.

As the ratio of acoustic energy that directly transmits though the protection cover 15 becomes large, the amount of acoustic energy that indirectly transmits through it, that is, the amount of acoustic energy used to vibrate the protection cover 15 becomes small. As the area of the acoustically transparent portion for transmitting acoustic energy from the speaker 13 (corresponding to a portion touching the air in a portion opposing the speaker 13, see FIG. 11) becomes large, the amount of acoustic energy per unit area used to vibrate the protection cover 15 becomes small. The farther the acoustically transparent portion is away from the speaker 13, the less the troublesomeness of the vector of acoustic energy becomes. The acoustic energy itself depends on acoustic output. Thus, it has been confirmed by an experiment how much area of the acoustically transparent portion and how much size of the distances d1 and d2 are needed to maintain a desirable acoustic characteristic against acoustic output (the maximum acoustic output in this case; unit=W). FIG. 3 is a graph illustrating the experiment result. A line A indicates distances d1 and d2 at least needed to maintain a desirable acoustic characteristic against the maximum acoustic output. A line B indicates the area of an acoustically transparent portion at least needed to maintain a desirable acoustic characteristic against the maximum acoustic output. The experiment result illustrated in FIG. 3 is obtained by using the speaker 13 having the size of φ16*3.65 mm.

As illustrated in FIG. 3, the larger the maximum acoustic output is, the larger the minimum necessary distances d1 and d2 (hereinafter called "minimum necessary distance") becomes and also the larger the minimum necessary area of an acoustically transparent portion (hereinafter called "minimum necessary area") becomes. If the maximum acoustic output and the minimum necessary area are expressed as x and s, respectively, the relationship between the maximum acoustic output and the minimum necessary area s can be approximated as follows.

$$s=ax+b \quad (1)$$

wherein,
a: Coefficient under 114 more larger than 99
b: Constant under 91 more larger than 84

On the other hand, the minimum necessary distances d1 and d are expressed as d, the relationship between the maximum acoustic output and the minimum distance d can be approximated as follows.

$$d=cx+e \quad (2)$$

wherein,
c: Coefficient under 0.5 more larger than 0.4
e: Constant under 0.25 more larger than 0.2

It is confirmed that each of the relationships expressed in the above expressions (1) and (2) can be maintained up to the maximum acoustic output of almost 0.1 W. Therefore, a desirable acoustic characteristic can be obtained by setting the area of an acoustically transparent portion S more than minimum necessary area s calculated by (ax+b), or by setting the distances d1 and d2 more than minimum necessary distance d calculated by (cx+e) in the range of 0.1 W to 0.8 W of the maximum acoustic output.

FIG. 4 illustrates the minimum necessary area s, the minimum necessary distance d and the volume of sound of a sample incoming tone at a distance of 10 cm for each maximum acoustic output. The distance of 10 cm corresponds to a distance from the chassis 11. From FIG. 4, it is found that the substantially sufficient amount of sound can be obtained.

Conventionally, in order to maintain a desirable acoustic characteristic, distances d3 and d4 of between 2 and 5 mm are secured. However, as illustrated in FIGS. 3 and 4, even when distances d1 and d2 are between 0.35 mm or more and 0.6 mm or less, a desirable acoustic characteristic can be maintained. Therefore, the portable device can be easily made smaller and thinner. Since according to the necessary maximum acoustic output, a minimum speaker 13 (acoustic component) can be adopted, the portable device can be also easily made smaller and thinner.

Figure 5:
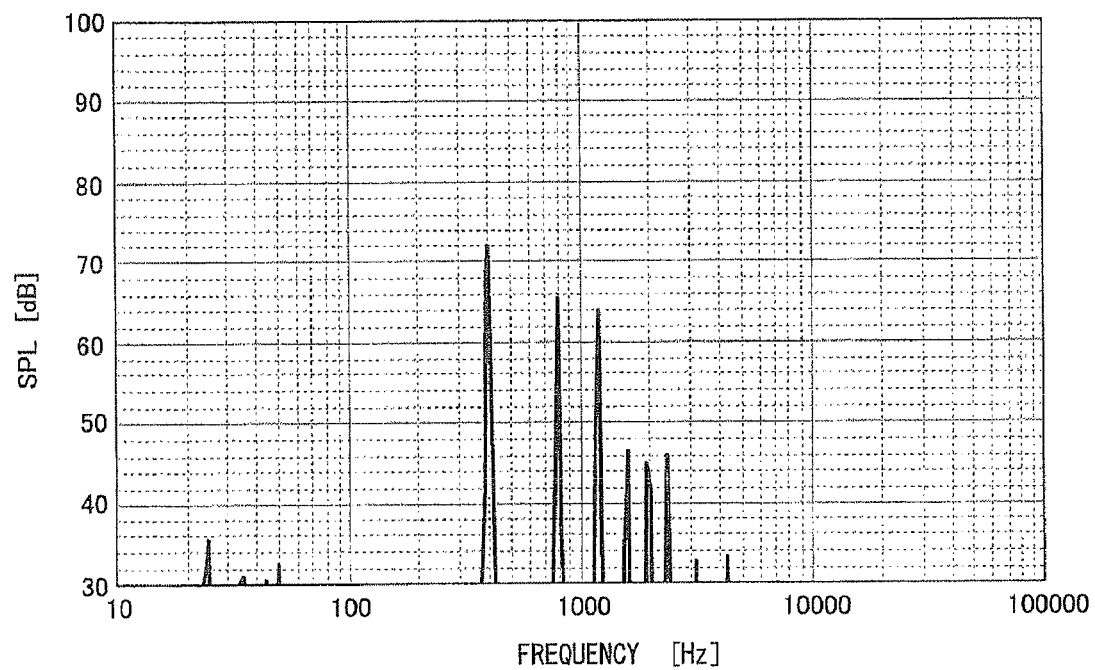
FIG. 5 is a graph illustrating an acoustic characteristic at a distance of 10 cm when 154 mm$^2$ is secured as the area of an acoustically transparent portion and sound of 400 Hz is emitted from a speaker with an acoustic output of 0.4 W.

FIG. 5 is a graph illustrating an acoustic characteristic at a distance of 10 cm when 154 mm² is secured as the area of an acoustically transparent portion and sound of 400 Hz is emitted from a speaker with an acoustic output of 0.4 W. The horizontal and vertical axes represent frequency and sound pressure level (SPL), respectively.

In this case, the area of the acoustically transparent portion is the minimum necessary area or more. Therefore, as illustrated in FIG. 5, a desirable acoustic characteristic can be obtained.

Figure 6:
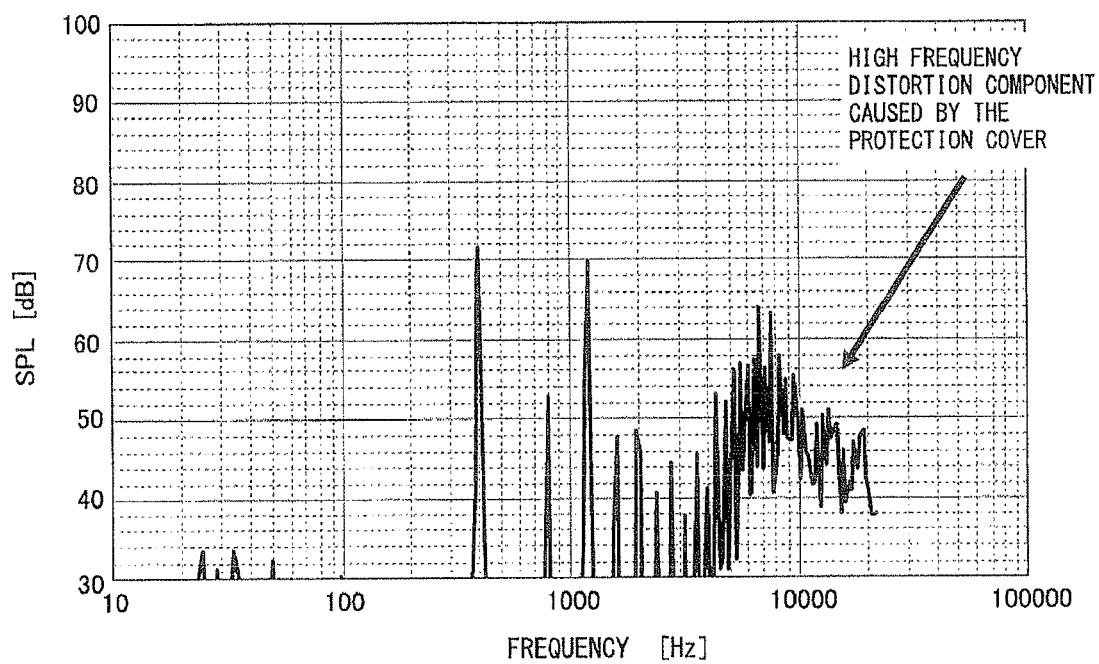
FIG. 6 is a graph illustrating an acoustic characteristic at a distance of 10 cm when 114 mm$^2$ is secured as the area of an acoustically transparent portion and sound of 400 Hz is emitted from a speaker with an acoustic output of 0.4 W.

FIG. 6 is a graph illustrating an acoustic characteristic at a distance of 10 cm when 114 mm² is secured as the area of an acoustically transparent portion and sound of 400 Hz is emitted from a speaker with an acoustic output of 0.4 W. As illustrated in FIG. 5, the horizontal and vertical axes represent frequency and sound pressure level (SPL), respectively.

In this case, the area of the acoustically transparent portion is the minimum necessary area or less. Therefore, vibration becoming a high frequency distortion component occurs on the protection cover 15 and as illustrated in FIG. 6, large sound is emitted widely in a high frequency range. In the present embodiment, the occurrence of such a high frequency distortion can be avoided or suppressed to a substantially non-problematical level.

As described above, the minimum necessary area of an acoustically transparent portion and the minimum necessary distance of distances d1 and d2 vary depending on the maximum acoustic output. Therefore, in order to manufacture a portable device satisfying the dependence relationship, the speaker 13 (acoustic component) attaching the packing 14 can be prepared as an acoustic component assembly. Alternatively, a structure the protection cover 15 also further attached above can be prepared as the acoustic component assembly. For the material of the packing 14, rubber, sponge, gel-like rubber or the like can be used. Each of them has the following features.

Since rubber is relatively heavy, it is superior in a sound insulation characteristic. However, since it has a problem in positioning accuracy and the like, it is easily inclined to cause inconveniences, such as an opening and the like. As to sponge, an independent bubble type is preferable. Although such sponge and gel-like rubber are soft, they can be used without special problem. However, since it is light, they are somewhat inferior in an acoustic sealing ability (sound insulation characteristic). In that case, since the thickness is 1 mm or less and they are not affected by sound insulation, of them, sponge can be relatively easily used.

A portable device adopting the acoustic component disposition method according to the present embodiment, that is, a portable device according to the present embodiment is described in detail below with reference to FIGS. 7 through 12.

Figure 7:
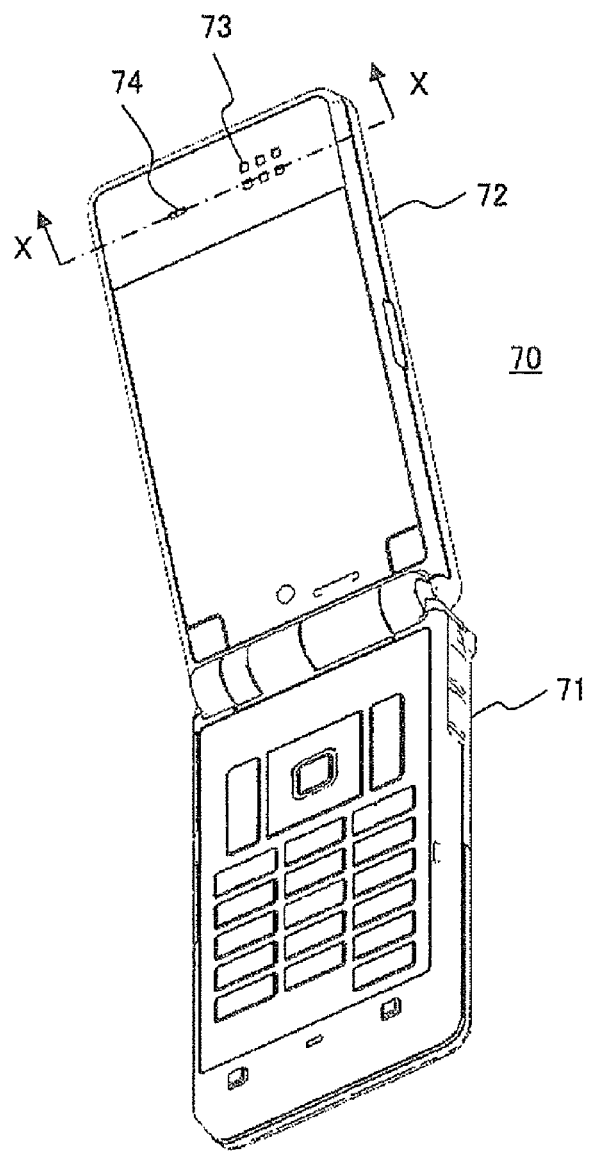
FIG. 7 is the appearance of a portable device according to an embodiment of the present invention.

FIG. 7 is the appearance view of a portable device according to the present embodiment. The portable device 70 is a cell phone, which comprises a fixed unit 71 provided with a plurality of switches operated by a user and a movable unit 72 in which a display device is disposed and whose positional relationship with the fixed unit 71 can be modified. A plurality of holes 73 for emitting incoming sound and the like and a hole for emitting the voice of a communication partner are provided in the upper section of the movable unit 72.

Figure 8:
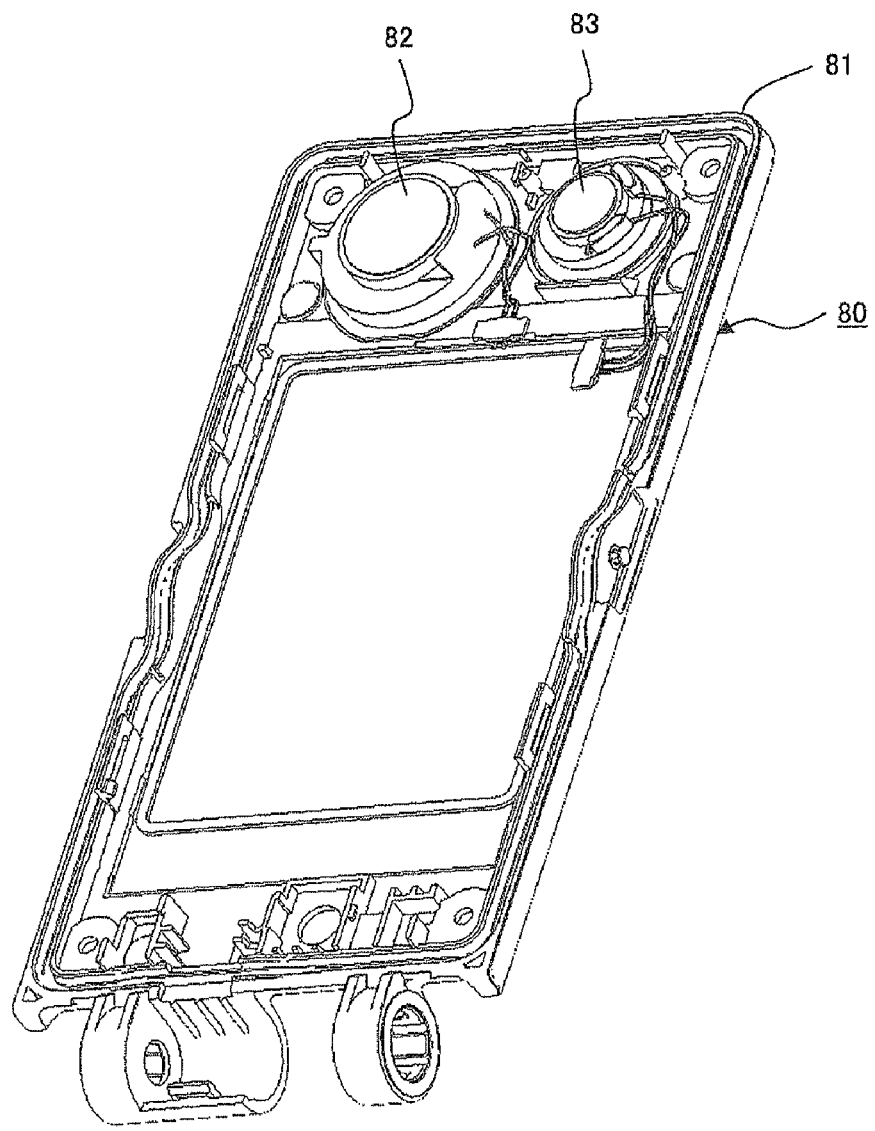
FIG. 8 is an appearance view illustrating the inside of a front portion 80 opposing a fixing portion 71 in a movable unit 72.

FIG. 8 is an appearance view illustrating the inside of a front portion 80 opposing a fixing portion 71 in a movable unit 72. As illustrated in FIG. 8, A speaker 82 is attached to the inside of the plurality of holes 73 provided for the chassis 81 and a speaker 83 is also attached to the inside the hole 74. The speaker 82 corresponds to the speaker 13 illustrated in FIG. 1. Therefore, hereinafter the speaker 83 is called "receiver" for convenience.

Figure 9:
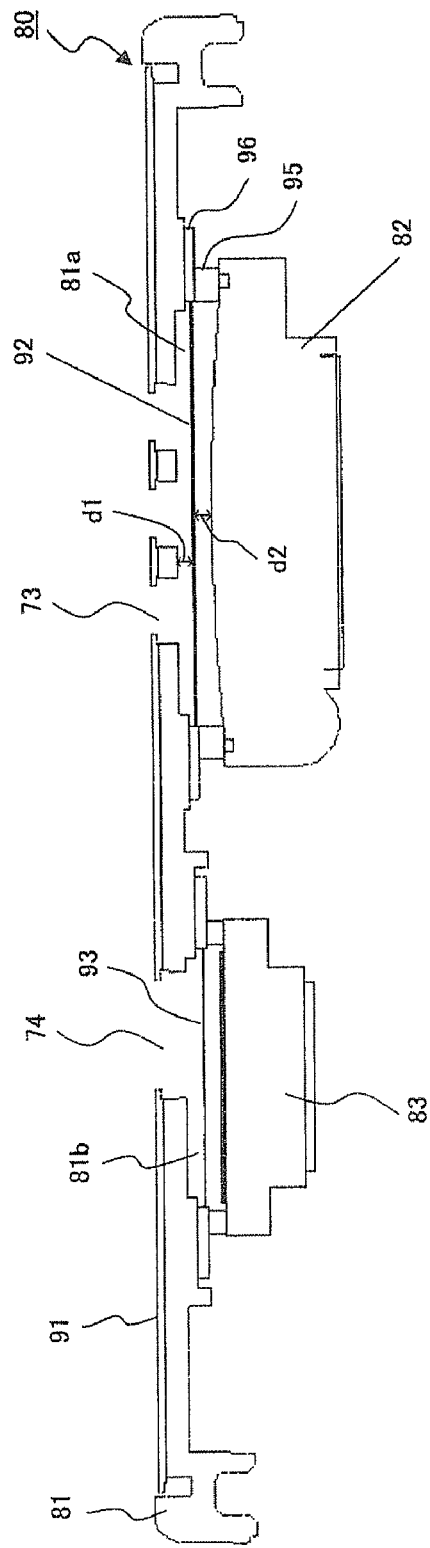
FIG. 9 is the cross-sectional view of the front portion 80.

FIG. 9 is the cross-sectional view of the front portion 80. The cross-sectional view is obtained by cutting the front unit 80 at the X-X line illustrated in FIG. 7. As illustrated in FIG. 9, a dummy seal is pasted on the outside surface of the chassis 81 and waterproof protection covers 92 and 93 are disposed insides of the holes 73 and 74, respectively.

For the speaker 82, a speaker cover 82a is provided in the upper section of a vibration plate, which is not illustrated in FIG. 9. Therefore, the distance d2 is between the protection cover 92 and the speaker cover 82a. The distance d1 is between the protection cover 92 and the chassis 81.

Figure 10:
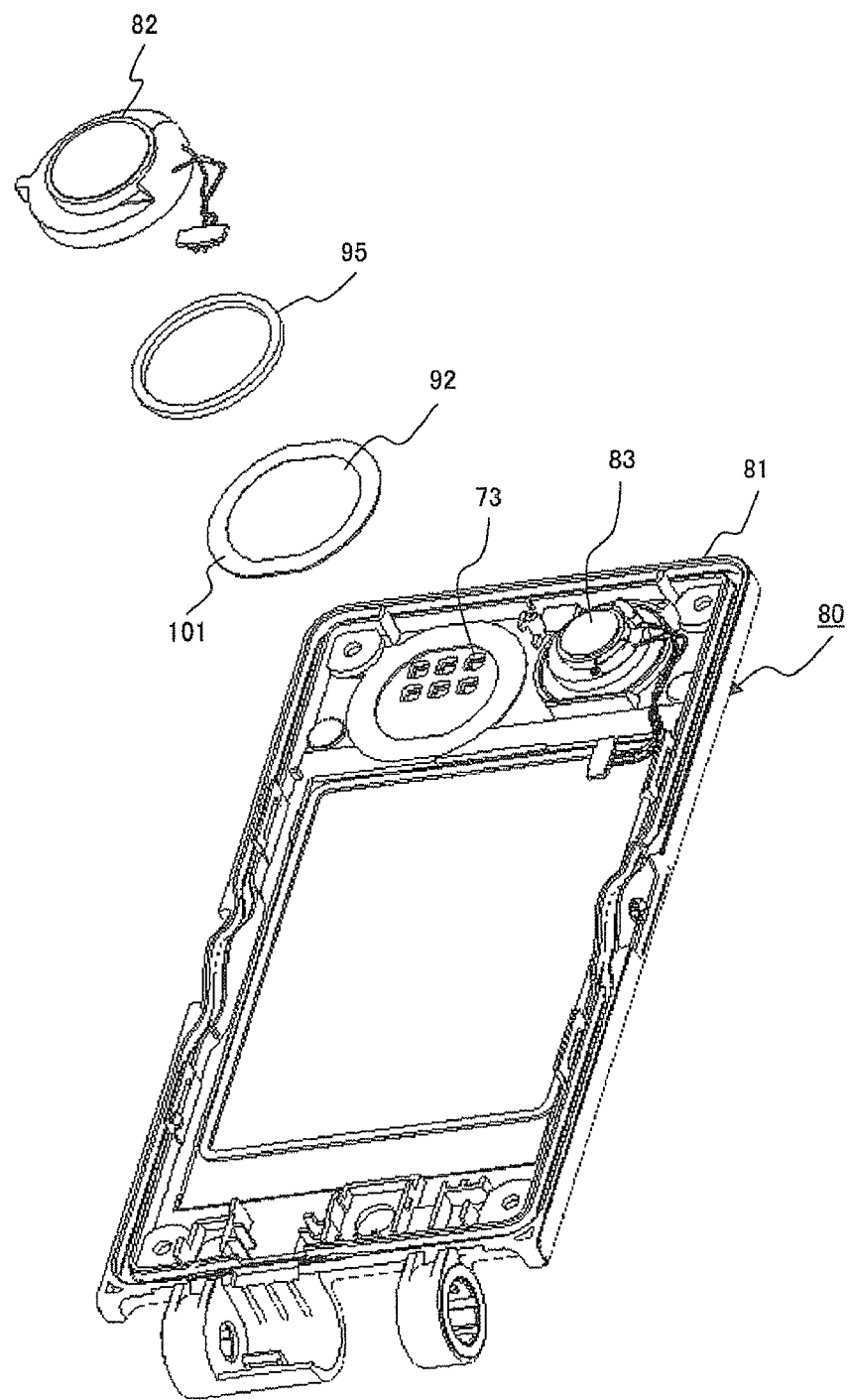
FIG. 10 is the disassembly view of an acoustic component assembly according to an embodiment of the present invention.
Figure 11:
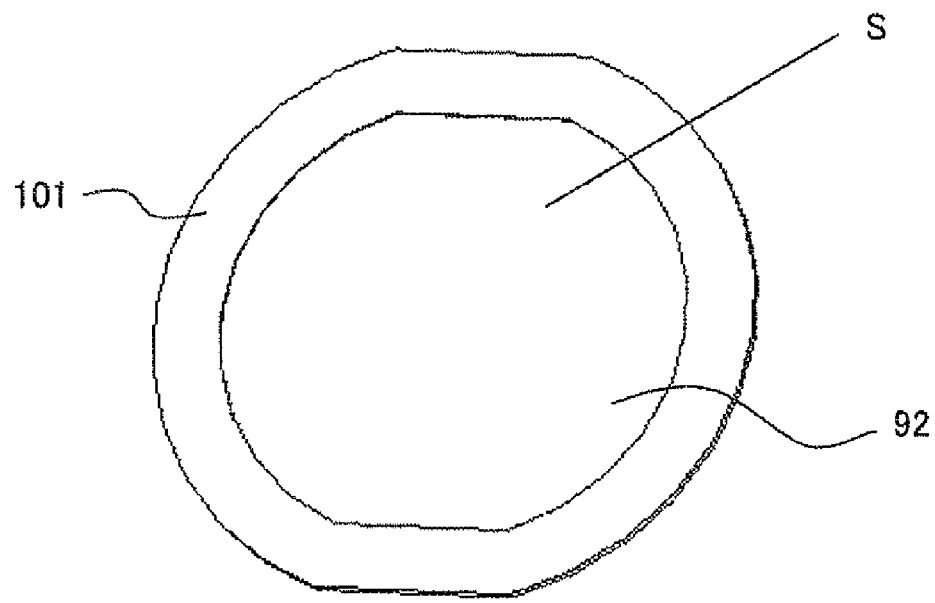
FIG. 11 illustrates the acoustically transparent area of the waterproof protection cover.

As illustrated in FIGS. 9 and 10, packing 95 is fixed to the speaker 82, for example, by adhesive and the protection cover 92 is fixed to the packing 95 by a both-sided tape 101. An acoustic component assembly (FIG. 12) provided with the protection cover 92, the packing 95 and the speaker 82 is fixed to the chassis 81 by sticking the protection cover 92 and the chassis 81 by the both-sided tape 96. Since the protection cover 92 is fixed by a both-sided tape 101 (and 96), as illustrated in FIG. 11, the inside of the both-sided tape 101 becomes the area S of the acoustically transparent portion.

The place to which the acoustic component assembly is fixed, that is, the inside of the chassis in the portion where a plurality of holes 73 is provided is made a concave unit 81a which is concave toward outside. This is because the distance d1 can be made the minimum necessary distance or more without preparing another piece of packing or the like. Since the minimum necessary distance can be left short (FIGS. 3 and 4), it can be coped with by such a concave unit 81a. In this case, since the number of components and the number of assembly steps can be suppressed, its production cost can be also reduced.

Although in the above-described preferred embodiment, distances d1 and d2 are set to the minimum necessary distance or more, the area S of an acoustically transparent portion can be made the minimum necessary area or more instead. Alternatively, both can be satisfied. The portable device can also be a digital camera, a radio set or a player which has a voice reproduction function instead of a cell phone. In other words, the present invention can be widely applied to any portable device the reduction of whose size/weight is desired. As described above, in the present invention, the area of the acoustically transparent portion for transmitting acoustic energy in a waterproof protection cover for covering an acoustic component is restricted on the basis of the relationship in which a desirable acoustic characteristic can be obtained between the area of an acoustically transparent portion and the maximum acoustic output of the acoustic component. By such a restriction, a desirable acoustic characteristic can be surely secured. Since compared with the prior art, it is unnecessary to secure a larger area, a more compact component can be adopted and thereby a smaller and thinner portable device can be easily realized.

At least one of a distance (the first distance) between the center portion of an acoustically transparent portion and a member located in a position nearest to the center portion on the acoustic component side and the second distance between the center portion and a member located in a position nearest to the center portion on the chassis side is restricted on the basis of a relationship in which a desirable acoustic characteristic specified taking into consideration the maximum acoustic output of an acoustic component. By such a restriction, a desirable acoustic characteristic can be surely secured. Since compared with the prior art, it is unnecessary to secure a larger area, a more compact component can be adopted and thereby a smaller and thinner portable device can be easily realized.

The invention claimed is:

1. A portable device in which a waterproof protection cover and an acoustic component are disposed inside a chassis provided with one hole or more, said device comprising:
an acoustic component whose maximum acoustic output is between 0.25 W or more is adopted as the acoustic component;
a waterproof protection cover in which an acoustically transparent portion for transmitting acoustic energy from the acoustic component through it is secured; and
a distance between a center portion of the acoustically transparent portion and a member located in a position nearest the center portion on the acoustic component side is between 0.35 mm or more and 0.6 mm or less.

2. The portable device according to claim 1, wherein
a distance between the center portion of the acoustically transparent portion and a member located in a position nearest the center portion on the chassis side is between 0.35 mm or more and 0.6 mm or less.

3. The portable device according to claim 1,
wherein
a GURLEY number for indicating a gas transparent characteristic of the waterproof protection cover is between 1 and 10 seconds.

4. A portable device in which a waterproof protection cover and an acoustic component are disposed inside a chassis provided with one hole or more, wherein:
an acoustic component whose maximum acoustic output is between 0.25 W or more is adopted as the acoustic component;
a waterproof protection cover in which an acoustically transparent portion for transmitting acoustic energy from the acoustic component is secured; and
a distance between a center portion of the acoustically transparent portion and a member located in a position nearest the center portion on the chassis side is between 0.35 mm or more and 0.6 mm or less.

5. The portable device according to claim 4,
wherein
a GURLEY number for indicating a gas transparent characteristic of the waterproof protection cover is between 1 and 10 seconds.

6. A portable device in which a waterproof protection cover and an acoustic component are disposed inside a chassis provided with one hole or more, wherein:
a waterproof protection cover in which an acoustically transparent portion for transmitting acoustic energy from the acoustic component is secured; and
an area s of the acoustically transparent portion satisfies the following relationship, $$s=ax+b$$

wherein,
x: the maximum acoustic output of the acoustic component
a: Coefficient under 114 more larger than 99
b: Constant under 91 more larger than 84.

7. The portable device according to claim 6, wherein
both the first distance and the second distance satisfy the relationship.

8. The portable device according to claim 6,
wherein
the maximum acoustic output is 0.1 W or more.

9. The portable device according to claim 6, wherein
a GURLEY number for indicating a gas transparent characteristic of the waterproof protection cover is between 1 and 10 seconds.

* * * * *